Oct. 17, 1939.  G. R. FOLDS  2,176,254
HEAT MOTOR
Original Filed April 23, 1932
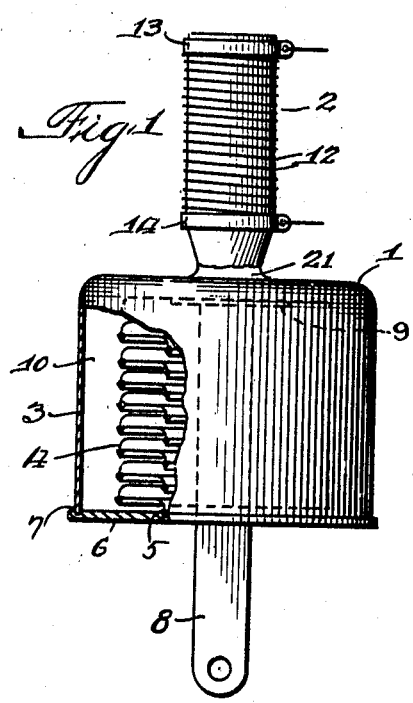
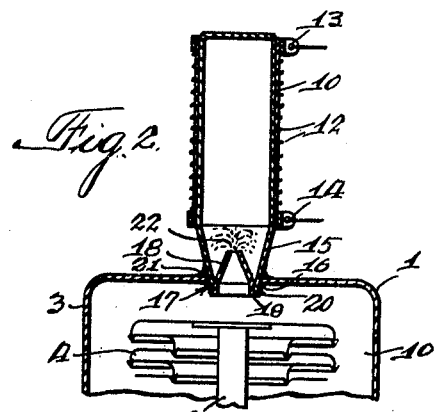
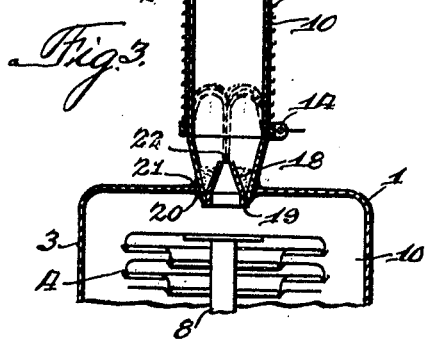
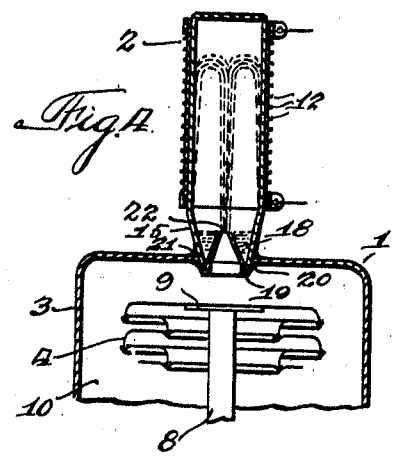
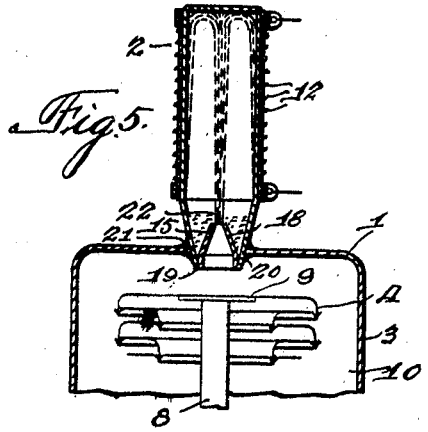
Inventor:
George R. Folds.
By Asmo, Thiess, Olsen & Mecklenburger
Attys.

Patented Oct. 17, 1939

2,176,254

UNITED STATES PATENT OFFICE 2,176,254

HEAT MOTOR

George R. Folds, Chicago, Ill., assignor to Cook Electric Company, Chicago, Ill., a corporation of Illinois Application May 18, 1934, Serial No. 726,206, now Patent No. 2,147,695, dated February 21, 1939, which is a division of application No. 607,034, April 23, 1932, now Patent No. 1,996,237, dated April 2, 1935. Divided and this application September 8, 1938, Serial No. 228,889

3 Claims. (Cl. 60—25)

My invention relates to heat motors and more particularly to a vapor motor adapted to be influenced by the action of a volatile fluid, or like means.

The invention is particularly directed to an improvement upon the structure disclosed and claimed in United States Letters Patent No. 1,983,314, granted December 4, 1934, to Roy M. Schultz and assigned to the assignee of the present application which is a division of original patent application Serial No. 607,034, filed April 23, 1932, that resulted in United States Letters Patent No. 1,996,237, issued April 2, 1935, and a subsequent divisional application, Serial No. 726,206, filed May 18, 1934, that resulted in United States Letters Patent No. 2,147,695, issued February 21, 1939.

Devices of this type, which are constructed in the manner to be influenced by the thermal expansion of a volatile fluid, usually consist of an expansible and contractible vessel cooperating with a suitable source of heat arranged to heat the fluid and increase the pressure within the vessel. Numerous factors obviously enter into the timing of the movement of the vessel. It has been found that the vessel contracts at a rather slow rate after the heat is discontinued and that the initial contracting movement is slow due to the time required before heat is dissipated sufficiently to effectively lower the pressure. The cooling action is usually so slow that it is difficult to control the contracting movement in proper timed relation to the movement of other devices, such as temperature controls or regulators, to which the heat motor may be adapted, usually as an actuating element.

One of the objects of the present invention resides in the provision of an improved form of heat or vapor motor having a heating tube or boiler provided with a heating zone communicating with an expansible and contractible vessel and a source of heat, which are so arranged that the contraction of the vessel is made rapid, or accelerated, by rapid cooling of the heating zone or heater.

More specifically, this result may be accomplished by arranging for a rapid return of the cool volatile fluid into the heating zone or heater. Accordingly, the heater is quickly cooled and the pressure rapidly reduced to permit rapid contraction of the vessel.

The specific mechanism, which is an improvement over the structure disclosed and claimed in the aforesaid Patent 1,983,314, may take the simple and inexpensive form of a conical jet disposed between the vessel and the heater. Operation of the power stroke will depress the liquid into the vessel where it will remain as long as the pressure in the heater and the pressure in the vessel are balanced. When the heat is discontinued at the heater and the temperature is lowered, this pressure balance will be destroyed and the relatively cool liquid in the vessel will surge upwardly into the heater and be sprayed by the conical jet against the hot walls of the heater to cool the same rapidly.

It is to be understood that the travel of the vessel on its return stroke is not necessarily limited to a contraction of the vessel, but may refer to an expansion of the vessel where a reverse action in the operation of the vessel is employed.

Further objects and advantages of the invention will be apparent from the following description when taken in connection with the accompanying drawing in which:

Figure 1 is an elevational view partly in section of a heat motor embodying the invention; and Figs. 2 to 5, inclusive, are vertical sectional views of this heat motor, but omitting the lower portion whereby to illustrate a quick return of the volatile liquid into the tube after the heat has been discontinued and the pressure balance destroyed.

In the drawing, wherein, for the purpose of illustration, there is shown a preferred embodiment of the invention, the vapor or heat motor may comprise an expansible and contractible vessel 1 having a volatile liquid therein and a tube 2 or boiler (forming a part of a heating device) in communication with the vessel and which receives a portion of the liquid. This vessel 1 is preferably shown as comprising a well-known form of bellows which readily expands or contracts upon an increase of pressure therein. Heating tube 2 may be closed at either end and communicate at the opposite end with vessel 1 and in fact form a part or extension of said vessel.

As to the specific form of heating device that may be used, it is obvious that an electrical resistance coil may be conveniently located at or adjacent heating tube 2. A heating zone will be provided within heating tube 2 for heating the volatile liquid and driving it into vessel 1 by volatilization. The pressure within the tube will be gradually increased until the level of the liquid is depressed, whereupon further volatilization stops as the liquid is driven out of the heating zone. It is by this means that the predetermined expansion or movement of vessel 1 may be effectively obtained and held without danger of the pressure building up to a point where the vessel will burst. This subject matter has been disclosed and claimed in United States Letters Patent No. 1,885,285, granted November 1, 1932, to the assignee of the present application.

Although any suitable form of an expansible and contractible vessel may be employed, it is shown as comprising an inverted rigid cup 3 and an expansible and contractible wall 4. Expansible and contractible wall 4 may be any well-known form of bellows arranged in nested relation with respect to cup 3 and hermetically sealed at 5 to a plate in the form of ring 6, to which cup 3 is also hermetically sealed at 7. A movable actuating rod 8 passes through the central opening of ring 6 and is adapted to be attached to the upper end of wall 4 by any suitable means, such as a plate 9.

A sheet of mica 10, or other suitable insulation, may be wrapped about heating tube 2 so as to provide electrical insulation for an electrical resistance wire or heat coil 12 wound about the tube. Terminal bands 13 and 14 are clamped at proper points along tube 2 to receive the ends of heat coil 12. While I have shown a heat coil of an electrical circuit for furnishing heat or acting as a source of heat for the vapor motor, it will be understood that any suitable heating means may be employed.

Figs. 2 to 5, inclusive, illustrate in cross section the construction of the heater and the manner of connecting tube 2 to the outer wall 3 of the expansible and contractible chamber 10. The lower end of the tube is tapered at 15, the end 16 entering an opening 17 in outer wall 3. A jet 18 constructed in the form of a conically-shaped nipple is inserted in the lower end 16 of tapered end 15 and connected thereto by means of a flange 19 and a soldered connection 20. A second soldered connection 20 is provided about the outside of lower end 16 and the outer wall 3 about the opening 17 to cooperate in providing a hermetical seal between the lower tube end 16 and the outer wall. Jet 18 is provided with an orifice or small opening 22.

The purpose of providing jet 18 between the tube and the vessel is to effect a spraying action by the volatile liquid as the latter returns into the tube whereby to bring the volatile fluid rapidly into contact with the heated wall of the tube. I find that this spraying action of the volatile liquid, which is effected by jet 18, reduces the time required to cool the tube and effects a return of the motor substantially in one-sixth of the time required heretofore in the return of the liquid when the jet 18 was not employed.

Figs. 2 to 5, inclusive, illustrate approximately the manner the volatile fluid is returned into the tube by jet 18 when the flow of current through the resistance coil is discontinued by the opening of the switch, which may be in the circuit controlling the flow of current, the upper walls of the tube will cool. At least a portion of the vapors in the tube, which holds the unvaporized liquid in chamber 10, will condense and thereby destroy the pressure balance between the vapor in the tube and the pressure in chamber 10. After the initial cooling action, which effects initial condensation and drop of pressure, a slight bubbling or spraying of the volatile liquid through orifice 22 into the lower end of the tube will occur, as shown in Fig. 2. This slight bubbling or spraying will occur for a second or so when the spray will immediately take the form shown in Fig. 3. The next form taken by the spray is shown in Fig. 4. It seems that these various forms of the spraying action is not obtained by a slow rising of the spray stream in the tube to the positions shown in Figs. 3 and 4, but the change is by a spurting action of the stream from one spraying position to the other, which spurting action is rapid and causes a quick condensation of the vapor in the tube. This quick condensation not only shortens the time of the return stroke of the motor, but it permits of a quick action which is quite valuable in many cases, such as operation of certain types of gas valves, etc.

The time action of the spraying has been found to be relatively fast, and so much so that by the time the spray takes the form shown in Fig. 5, wherein the volatile liquid is being sprayed directly against the upper end of the tube, only enough volatile liquid has been returned into the tube to result in the liquid level, which is at that time slightly above the orifice 22. The liquid will be sprayed, however, through any liquid extending over the orifice 22, as shown in Fig. 5.

From experiments, I have found that the heat motor will contract or accomplish its return stroke within 25 to 35 seconds, as compared to the formerly required time of three minutes. This time may vary somewhat, however, with vessels of different sizes and capacities. Although the expansible and contractible wall 4 is shown in the drawing as expanding on the return stroke, it is to be understood that the reverse action in the operation of this wall may be used, as illustrated in United States Letters Patent No. 1,885,285, above referred to. Moreover, it will be understood that the above explanation of the action of the fluid returning into the tube is the result of my observations during certain operations I have conducted, but, notwithstanding, I do not intend to be limited to this action. The invention is directed more broadly to the purpose of effecting a rapid cooling in considerably less time by a simple device in the form of jet 18. The same result might obviously be obtained by a slight rearrangement of parts which would be within the contemplated scope of the invention. Variations in the details of the tube arrangement and heating means may be likewise employed without departing from the invention.

Jet 18 is an extremely simple and inexpensive device to accomplish the purposes described. It is easily mounted in position at and attached to the lower end of tube 2.

Without further elaboration, the foregoing will so fully explain the gist of my invention that others may, by applying current knowledge, readily adopt the same for use under varying conditions of service, without eliminating certain features, which may properly be said to constitute the essential items of novelty involved, which items are intended to be defined and secured to me by the following claims.

I claim:

1. A motor comprising, in combination, an expansible and contractible vessel and a substantially closed tube in communication with said vessel, a volatile fluid in said vessel and said tube, a movable pressure responsive work performing member, and means for vaporizing at least a portion of said volatile fluid and for creating thereby a pressure in said tube and consequently in said vessel whereby to displace the fluid from said tube into said vessel and actuate said work performing connection, and a conical jet disposed between said vessel and said tube to spray the displaced fluid into said tube upon its return from said vessel.

2. A motor comprising, in combination, a work chamber and a heating chamber, both being in communication and forming a substantially closed system, a volatile fluid in said chambers, heating means for vaporizing at least a portion of the fluid in said heating chamber to create a pressure whereby to displace any unvaporized fluid remaining in said heating chamber into said work chamber, and a conical jet disposed substantially between said chambers to spray the displaced fluid into said heating chamber upon its return from said work chamber.

3. A motor comprising, in combination, a work chamber and a heating chamber, both being in communication and forming a substantially closed system, a volatile fluid in said chambers, heating means for creating a pressure in said heating chamber whereby to displace the fluid in heating chamber into said work chamber, and a jet disposed substantially between said chambers, said jet being adapted, upon return of the displaced fluid from said work chamber, to cause the displaced fluid first to bubble slightly from said jet into said heating chamber, and thereafter in a spray of increasing height until contacting substantially all the heated surfaces of said heating chamber.

GEORGE R. FOLDS.